United States Patent
Nagai et al.

(10) Patent No.: US 7,868,490 B2
(45) Date of Patent: Jan. 11, 2011

(54) ACTUATOR

(75) Inventors: Takuya Nagai, Miyagi-ken (JP);
Yoshihiro Someno, Miyagi-ken (JP);
Naoyuki Tokuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 207 days.

(21) Appl. No.: 12/333,888

(22) Filed: Dec. 12, 2008

(65) Prior Publication Data

US 2009/0091194 A1 Apr. 9, 2009

(51) Int. Cl.
*H02K 41/00* (2006.01)
(52) U.S. Cl. ............... 310/12.19; 310/12.22; 310/12.25; 310/24
(58) Field of Classification Search ............... 310/12.19, 310/12.22, 12.25, 12.01, 12.21, 22, 24
See application file for complete search history.

(56) References Cited

FOREIGN PATENT DOCUMENTS

| JP | 2001-075031 | | 3/2001 |
|---|---|---|---|
| JP | 2002-112520 | | 4/2002 |
| JP | 2002112520 | A * | 4/2002 |
| JP | 2004-020956 | | 1/2004 |
| JP | 2004020956 | A * | 1/2004 |

* cited by examiner

*Primary Examiner*—Quyen Leung
*Assistant Examiner*—Leda Pham
(74) *Attorney, Agent, or Firm*—Brinks Hofer Gilson & Lione

(57) ABSTRACT

When currents are applied to driving coils, electromagnetic forces are generated between the currents and magnetic fluxes passing through gaps, a shaft member is swung in one direction, and a tilt angle of a mirror (controlled object) changes relative to a support center point. Electromotive forces generated in detection coils when the magnetic fluxes pass through the detection coils are given as feedback signals to a control unit. The control unit generates currents on the basis of the feedback signals, and applies the currents to the driving coils. By detecting the velocity of the mirror during swinging with the detection coils, the structure of the actuator can be simplified. Further, the responsivity can be increased, and the tilt angle of the mirror can be detected with high accuracy.

7 Claims, 7 Drawing Sheets

ACTUATOR

CLAIM OF PRIORITY

This application claims benefit of the Japanese Patent Application No. 2006-174110 filed on Jun. 23, 2006, which is hereby incorporated by reference.

BACKGROUND OF THE INVENTION 1. Field of the Invention

The present invention relates to an actuator that sets the tilt angle of a controlled object, such as a mirror, in a desired direction. 2. Description of the Related Art Japanese Unexamined Patent Application Publication Nos. 2002-296518, 8-334723, and 5-119280 describe so-called planar galvanomirrors. In these galvanomirrors, two moving plates are provided inside the outermost peripheral substrate, and each of the moving plates is swingably supported by a pair of torsion bars.

In the galvanomirrors described in Japanese Unexamined Patent Application Publication Nos. 2002-296518 and 8-334723, a driving mechanism for driving a mirror includes coils respectively provided on an outer moving plate and an inner moving plate, and permanent magnets provided around or on the lower side of the coils.

The galvanomirror in Japanese Unexamined Patent Application Publication No. 5-119280 is driven by utilizing electrostatic attractive force. A mirror part is supported by a substrate via a pair of torsion bars. Strain gauges are provided near the bases of the torsion bars. The tilt angle of a mirror surface is controlled while measuring changes in resistance of the strain gauges.

However, in the galvanomirrors described in Japanese Unexamined Patent Application Publication Nos. 2002-296518 and 8-334723, since the coils that form the driving mechanism are planar coils, it is structurally difficult to increase the number of turns because of size limitations. For this reason, a sufficiently great driving force cannot be obtained, and it is difficult to increase the driving velocity (responsivity) of the mirror.

In Japanese Unexamined Patent Application Publication No. 5-119280, strains caused during deformation of the torsion bars are detected from changes in resistance with the strain gauges. However, such strain gauges have a low sensitivity and easily pick noise, and therefore, the detection accuracy is low. Moreover, since the strain gauges are susceptible to temperature changes, a temperature correction circuit is needed to increase the detection accuracy. This complicates the structure.

SUMMARY OF THE INVENTION

The present invention provides a highly responsive actuator that is suitable for use in a hologram apparatus and the like.

The present invention also provides an actuator that can accurately detect the tilt angle of a controlled object with a simple structure.

An actuator according to an aspect of the present invention includes a shaft member having a controlled object at one end thereof; a support member configured to support the shaft member swingably; a driving mechanism configured to drive the shaft member in a swinging direction; a sensor configured to detect a velocity of the controlled object during swinging; and a control mechanism configured to control the driving mechanism on the basis of a signal detected by the sensor. The driving mechanism includes a fixed section; a moving section mounted to the shaft member; a magnet and a pair of yokes provided in one of the fixed section and the moving section, the yokes respectively facing both poles of the magnet; and a plurality of cylindrical driving coils provided in the other of the fixed section and the moving section. The yokes have a plurality of arms extending sideward, and the arms of the yokes are movably placed in the driving coils. The sensor is placed in a gap in which the yokes face each other.

In this case, the actuator can accurately detect the tilt angle of a controlled object with a simple structure. Moreover, since the sensor detects the velocity of the controlled object during swinging, the detection accuracy can be made higher than when the amount of deformation is detected.

Since the above-described driving mechanism can obtain a great driving force, the actuator equipped with the driving mechanism is superior in responsivity.

Preferably, the sensor is formed by a detection coil configured to detect magnetic flux generated by the magnet.

In this case, the detection sensitivity of the sensor can be increased in accordance with the number of turns. Moreover, the angle of the shaft member and the tilt angle of the controlled object can be detected with high accuracy without any influence of temperature changes. For this reason, the actuator has a high detection accuracy and is highly resistant to temperature changes.

Preferably, the support member includes an outer frame portion supported by the fixed section; a middle frame portion provided inside the outer frame portion such as to swing around a first axis relative to the outer frame portion; and an inner frame portion provided inside the middle frame portion such as to swing around a second axis orthogonal to the first axis relative to the middle frame portion. The outer frame portion and the middle frame portion may be connected by a pair of first torsion bars arranged symmetrically, and the middle frame portion and the inner frame portion may be connected by a pair of second torsion bars spaced 90 degrees apart from the first torsion bars.

Preferably, the shaft member extends in an orthogonal direction orthogonal to both the first axis and the second axis on both sides of the inner frame portion in the orthogonal direction, and the shaft member is insert-molded with the inner frame portion. The controlled object may be provided on one side of the shaft member, and the magnet and the yokes, or the driving coils may be provided on the other side.

Since the inner frame portion is insert-molded with the shaft member, the shaft member and the inner frame portion can be connected firmly. For this reason, it is possible to increase the mounting strength of the members mounted on the shaft member, such as the yokes, the magnet, and the controlled object. Therefore, it is possible to increase the driving velocity (swing velocity) of the shaft member, and to enhance the responsivity of the actuator. Moreover, the utilization efficiency of the magnet can be increased, and this can achieve size reduction of the actuator.

Preferably, the control mechanism includes a detection circuit configured to convert the signal output from the sensor into data; a control unit configured to calculate a driving amount of the controlled object on the basis of the data; and a driver circuit configured to generate a current to be applied to the driving coils of the driving mechanism on the basis of the driving amount.

In this case, it is possible to adjust the tilt angle of the shaft member or the tilt angle of the controlled object with high accuracy.

BRIEF DESCRIPTION OF THE DRAWINGS

FIG. 5A shows a state before an arm moves, and FIG. 5B shows a state after the arm has moved;

DESCRIPTION OF THE PREFERRED EMBODIMENTS

Figure 1:
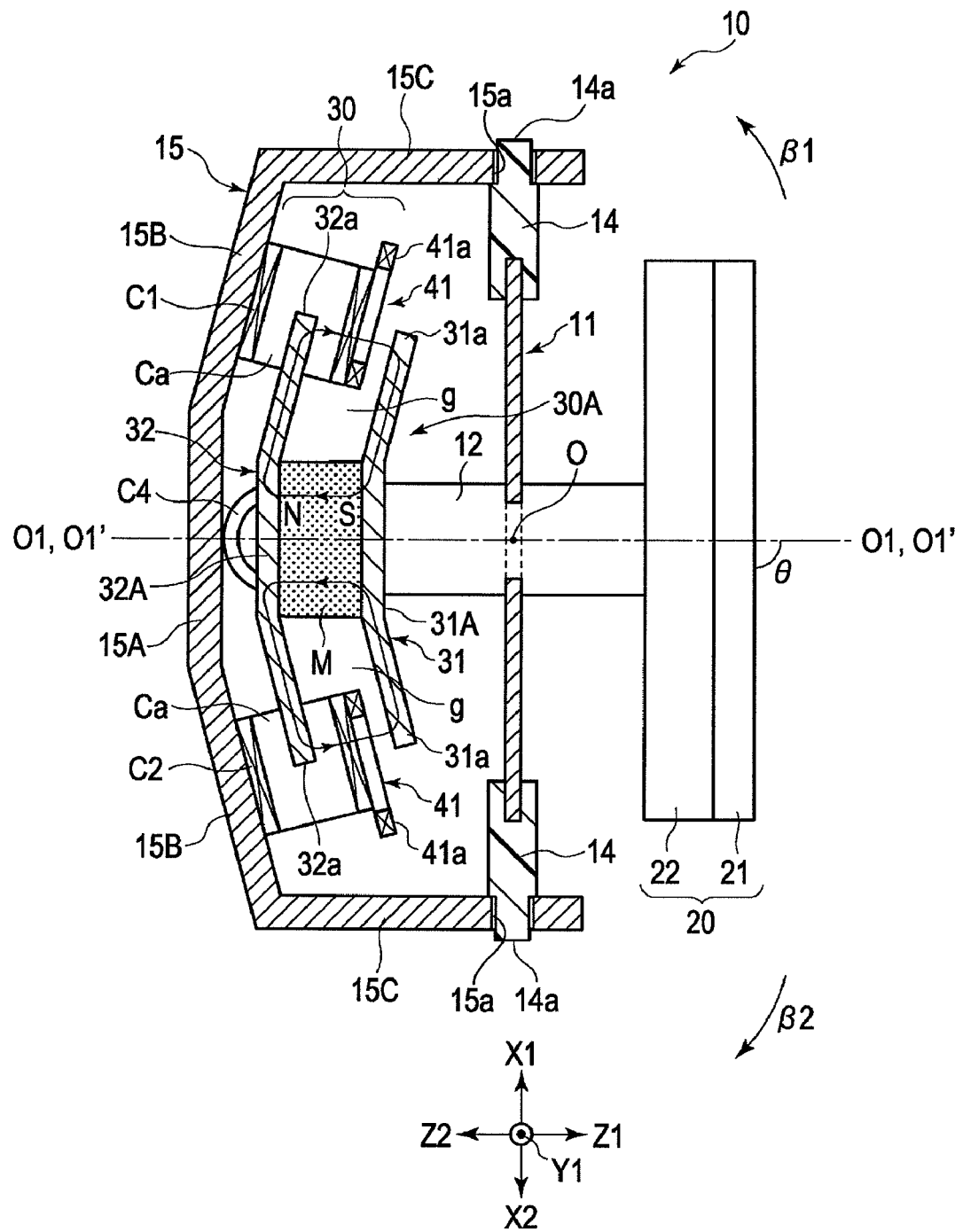
FIG. 1 is a cross-sectional view showing the overall configuration of an actuator according to an embodiment of the present invention.
Figure 2:
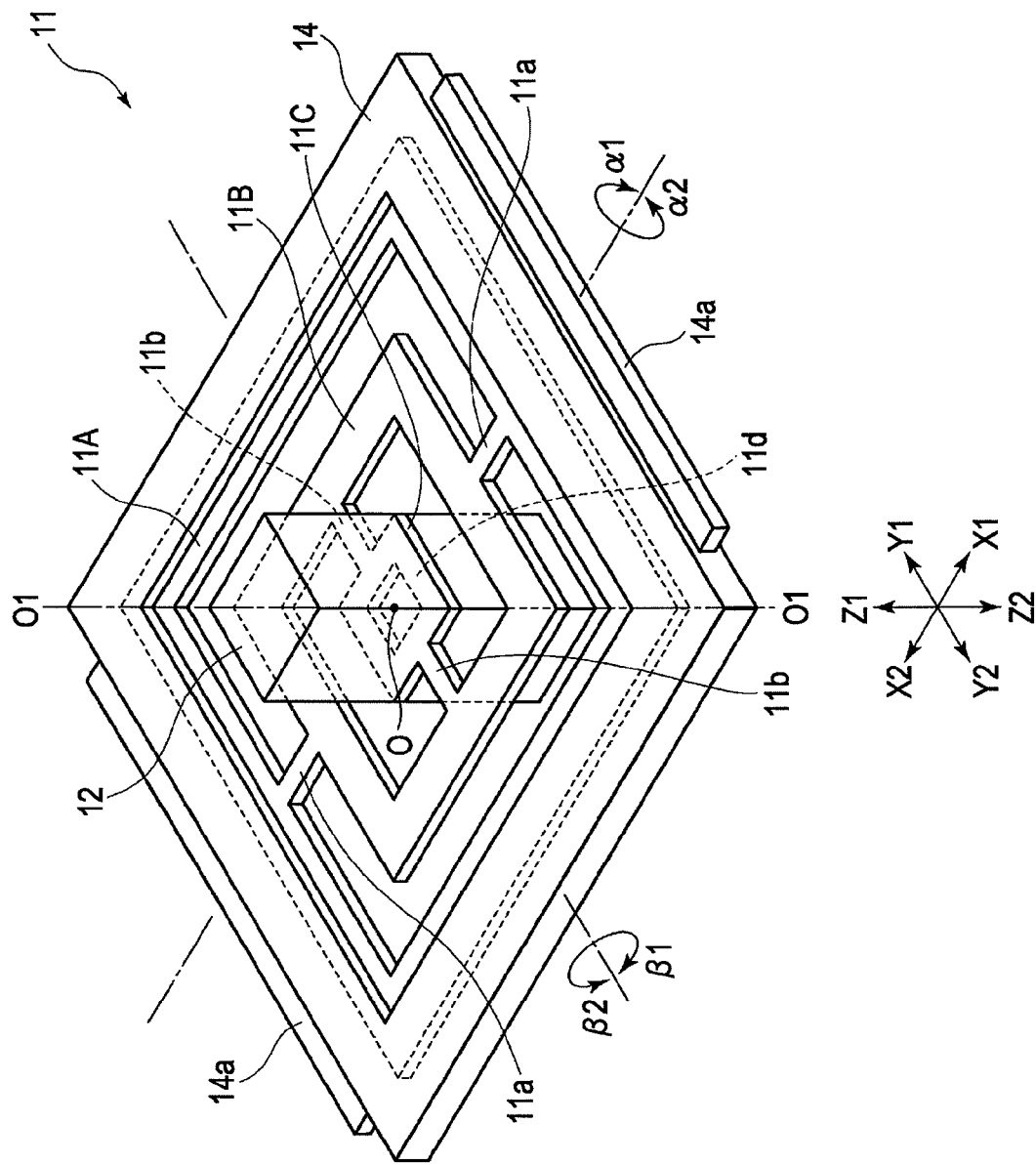
FIG. 2 is a perspective view of a support member.
Figure 3:
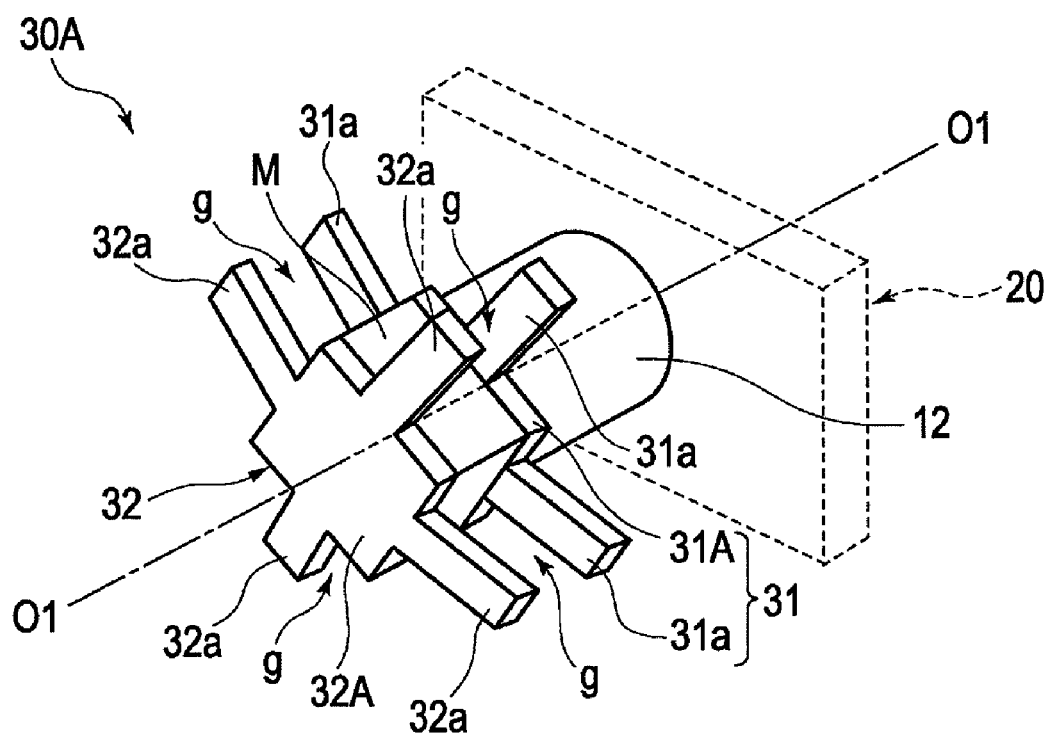
FIG. 3 is a perspective view of a magnetic-field generating unit in the actuator.

FIG. 1 is a cross-sectional view showing the overall configuration of an actuator according to an embodiment of the present invention, FIG. 2 is a perspective view of a support member, and FIG. 3 is a perspective view of a magnetic-field generating unit in the actuator.

In the following description, the X-, Y-, and Z-axes intersect at right angles, and a point where the X-, Y-, and Z-axes intersect is designated as the origin or a support center point O. An axis extending parallel to the Z-axis through the support center point O is designated as a neutral axis O1-O1.

Referring to FIG. 1, an actuator 10 according to the embodiment includes a mirror member 20 serving as a controlled object, and freely adjusts and sets a tilt angle (an angle formed between the neutral axis O1-O1 and a mirror 21) θ of the mirror member 20.

The actuator 10 also includes a support member 11, and a shaft member 12 supported in a manner such as to swing relative to the support member 11.

As shown in FIG. 2, the support member 11 is formed by, for example, a thin silicon substrate, and may include an outer frame portion 11A, a middle frame portion 11B, and an inner frame portion 11C each of which is shaped like a rectangular frame. The outer frame portion 11A is provided at a position farthest from the neutral axis O1-O1, and the inner frame portion 11C is provided at a position closest to the neutral axis O1-O1. The middle frame portion 11B is provided between the outer frame portion 11A and the inner frame portion 11C.

Preferably, the outer frame portion 11A and the middle frame portion 11B are connected via a pair of first torsion bars 11a. Similarly, the middle frame portion 11B and the inner frame portion 11C are connected via a pair of second torsion bars 11b.

The first torsion bars 11a are provided along the X-axis between the outer frame portion 11A and the middle frame portion 11B in a manner such as to be symmetrical with respect to the neutral axis O1-O1 (spaced 180 degrees apart from each other). The second torsion bars 11b are provided along the Y-axis between the middle frame portion 11B and the inner frame portion 11C in a manner such as to be symmetrical with respect to the neutral axis O1-O1 (spaced 180 degrees apart from each other) and to be spaced 90 degrees apart from the first torsion bars 11a around the neutral axis O1-O1.

For this reason, the middle frame portion 11B can deform to twist relative to the outer frame portion 11A in directions in which the first torsion bars 11a serve as the rotation axis (X-axis) (directions α1 and α2 in FIG. 2) Similarly, the inner frame portion 11C can deform to twist relative to the middle frame portion 11B in directions in which the second torsion bars 11b serve as the rotation axis (Y-axis) (directions β1 and β2 in FIG. 2). That is, the inner frame portion 11C is supported such as to swing on the support center point O in the rotating direction around the X- and Y-axes.

The shape of the outer frame portion 11A, the middle frame portion 11B, and the inner frame portion 11C is not limited to a rectangular frame shape, and may be other shapes such as a circle.

The shaft member 12 linearly extends in the Z-axis direction along the neutral axis O1-O1. Since the shaft member 12 is fixed to the inner frame portion 11C of the support member 11, it can swing on the support center point O around the X-axis and the Y-axis via the support member 11. In other words, the shaft member 12 can swing on the support center point O.

The shaft member 12 can be attached to the support member 11, for example, by insert molding. That is, the shaft member 12 can be attached to the support member 11 by inserting the inner frame portion 11C of the support member 11 in a predetermined mold and pouring and solidifying a resin material in a cavity surrounding the inner frame portion 11C. By forming an opening 11d in the center of the inner frame portion 11C, portions of the shaft member 12 extending from the support member 11 in the Z1- and Z2-directions can be combined. The shaft member 12 may be shaped like a prism, as shown in FIG. 2, or like a cylinder, as shown in FIG. 3.

A holding member 14 formed of synthetic resin is provided around the outer frame portion 11A. Convex fixing portions 14a project from edges of the holding member 14 in the X1- and X2-directions. Similarly to the shaft member 12, the holding member 14 is formed integrally with the outer frame portion 11A by insert molding.

The actuator 10 includes a fixed member 15 of substantially U-shaped cross section. The fixed member 15 includes a base bottom face 15A, inclined bottom faces 15B formed by slightly obliquely bending the base bottom face 15A, and side wall portions 15C formed by bending ends of the inclined bottom faces 15B in the Z1-direction. Slots 15a extending in the Y-direction are respectively provided at the leading ends of the side wall portions 15C. The fixing portions 14a of the holding member 14 are fitted in the slots 15a, so that the support member 11, the shaft member 12, and the holding member 14 are attached to the fixed member 15.

The mirror member 20 serving as a controlled object is provided at the leading end of the shaft member 12 in the Z1-direction in the figure. The mirror member 20 includes the above-described mirror 21, and a mirror holding member 22 for holding the mirror 21. The leading end of the shaft member 12 in the Z1-direction is fixed to the center of a surface of the mirror holding member 22 facing in the Z2-direction.

It is preferable that the mirror holding member 22 be formed integrally with the shaft member 12. However, the mirror holding member 22 may be formed by a separate process, and be fixed to the leading end of the shaft member 12, for example, with an adhesive or by screwing.

A magnetic-field generating unit 30A that forms part of a driving mechanism 30 is provided at the other end (in the Z2-direction) of the shaft member 12. The magnetic-field generating unit 30A includes a first yoke 31, a second yoke 32, and a magnet M.

As shown in FIG. 3, the first yoke 31 and the second yoke 32 have the same shape. The first yoke 31 includes a main body 31A substantially shaped like a square, and four arms 31a extending sideward from four side faces of the main body 31A, respectively. The four arms 31a do not extend perpendicularly to the neutral axis O1-O1, but obliquely extend such as to slightly tilt in one direction (Z1-direction).

Similarly, the second yoke 32 includes a main body 32A substantially shaped like a square, and four arms 32a obliquely extending from four side faces of the main body 32A, respectively.

The magnet M is clamped between the main body 31A of the first yoke 31 and the main body 32A of the second yoke 32. In this state, the four arms 31a of the first yoke 31 face the four arms 32a of the second yoke 32 in parallel, and gaps g are provided therebetween.

Thus, in the actuator 10 according to this embodiment, the mirror member 20 is provided at one end of the shaft member 12, and the magnetic-field generating unit 30A is provided at the other end thereof. The shaft member 12 is supported such as to swing relative to the support member 11. In other words, the shaft member 12 is supported such as to swing on the support center point O around the X-axis (in the directions $\alpha 1$ and $\alpha 2$) and around the Y-axis (in the directions $\beta 1$ and $\beta 2$).

As shown in FIG. 1, four driving coils C (individually denoted by C1, C2, C3, and C4) are provided on the inclined bottom faces 15B of the fixed member 15. With respect to the neutral axis O1-O1, the driving coil C1 is provided on the X1-side, the driving coil C2 is provided on the X2-side, the driving coil C3 is provided on the Y1-side, and the driving coil C4 is provided on the Y2-side. In FIG. 1, illustration of the driving coil C3 is omitted.

Each of the driving coils C is formed by winding a wire in the form of a cylinder (circular cylinder or rectangular cylinder). An opening Ca extends through the center of each driving coil C in a direction orthogonal to the winding direction. The four arms 32a of the second yoke 32 are movably inserted in the openings Ca of the driving coils C1, C2, C3, and C4. In short, the driving coils C1, C2, C3, and C4 are partly located in the four gaps g provided between the four arms 31a and the four arms 32a, respectively.

Since the driving coils C1, C2, C3, and C4 are cylindrical, as described above, the number of turns can be made more than that of a planar coil. For this reason, a great electromagnetic force can be easily generated, and the responsivity of the actuator 10 can be enhanced.

Here, it is assumed that the magnet M is magnetized as the south pole on the Z1-side, and as the north pole on the Z2-side, as shown in FIG. 1. In this case, magnetic fluxes $\phi$ form magnetic paths in the order "the north pole—the main body 32A of the second yoke 32—the four arms 32a of the second yoke 32—the four gaps g (driving coils C1, C2, C3, and C4)—the four arms 31a of the first yoke 31—the main body 31A of the first yoke 31—the south pole". In the gaps g, the magnetic fluxes $\phi$ interlink with currents flowing through the wires that form the driving coils C1, C2, C3, and C4.

A velocity sensor 41 is attached to each of the driving coils C1, C2, C3, and C4 provided in the gaps g. The velocity sensor 41 may be formed as a detection coil (planar coil) 41a in which a wire is wound in a planar or ring shape. The winding direction of the wire in the detection coil 41a is orthogonal to the driving coils C1, C2, C3, and C4. In other words, the winding direction of the wire in the detection coil 41a may be orthogonal to the direction of the magnetic flux $\phi$ passing through the gap g. For this reason, the velocity sensor 41 can detect the magnetic flux $\phi$ passing through the detection coil 41a. On the other hand, the driving coils C1, C2, C3, and C4 generate magnetic fluxes passing through the openings Ca. In short, the magnetic fluxes of the driving coils C1, C2, C3, and C4 are parallel to the winding direction of the detection coils 41a. Hence, the velocity sensors 41 rarely detect the magnetic fluxes generated by the driving coils C1, C2, C3, and C4.

In the above, the magnetic-field generating unit 30A and the driving coils C1, C2, C3, and C4 constitute the driving mechanism 30 that generates a driving force for swinging the controlled object (mirror member 20).

It is preferable that the mirror member 20 serving as the control object and the magnetic-field generating unit 30A that forms the moving section be balanced in weight on the support center point O. In this case, in a non-driving state in which no current is applied to the driving coils C1, C2, C3, and C4, an axial center O1'-O1' of the shaft member 12 coincides with the neutral axis O1-O1 (neutral position state).

Operation of the above-described actuator will be described.

Figure 4:
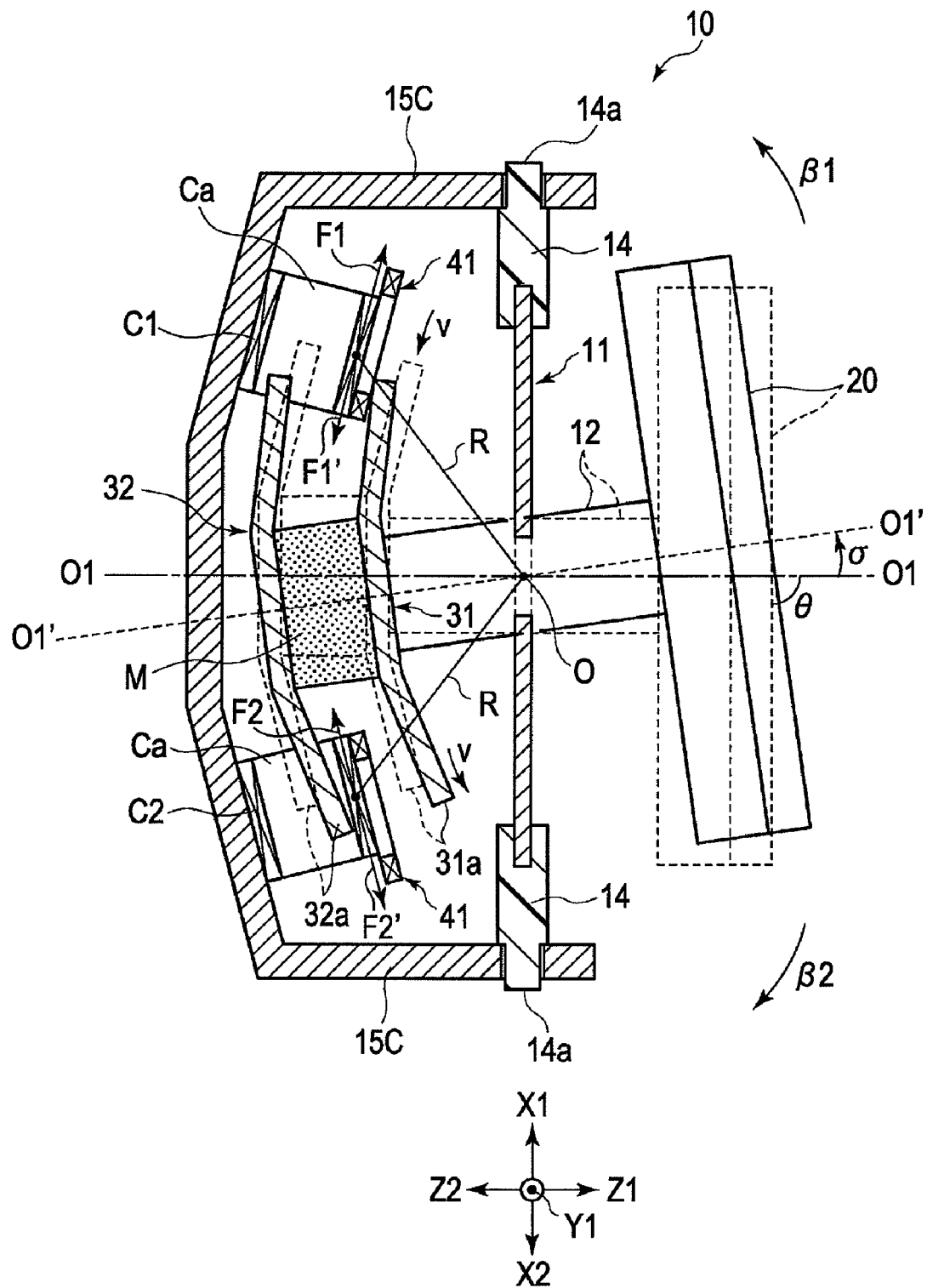
FIG. 4 is a cross-sectional view, similar to FIG. 1, showing an operating state of the actuator.
Figure 5A:
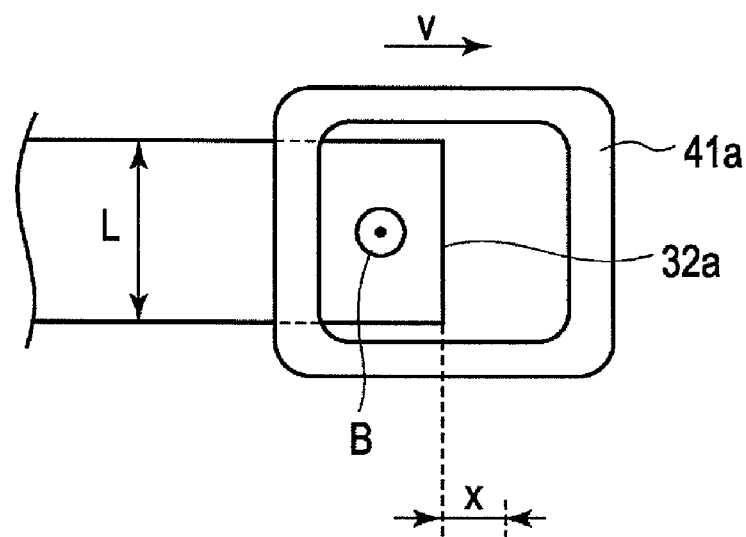
FIGS. 5A and 5B show a detecting operation of a velocity sensor.
Figure 5B:
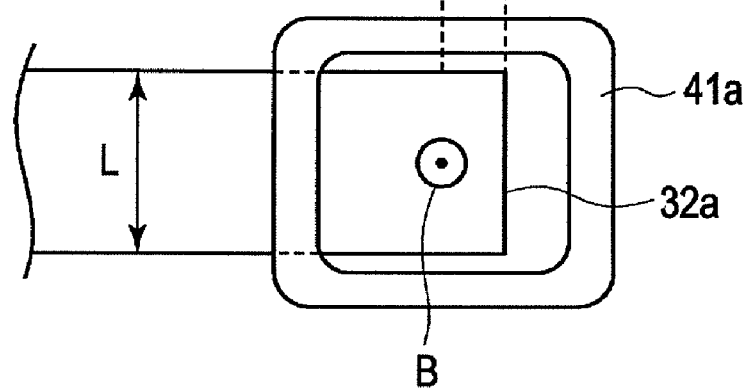
Figure 6:
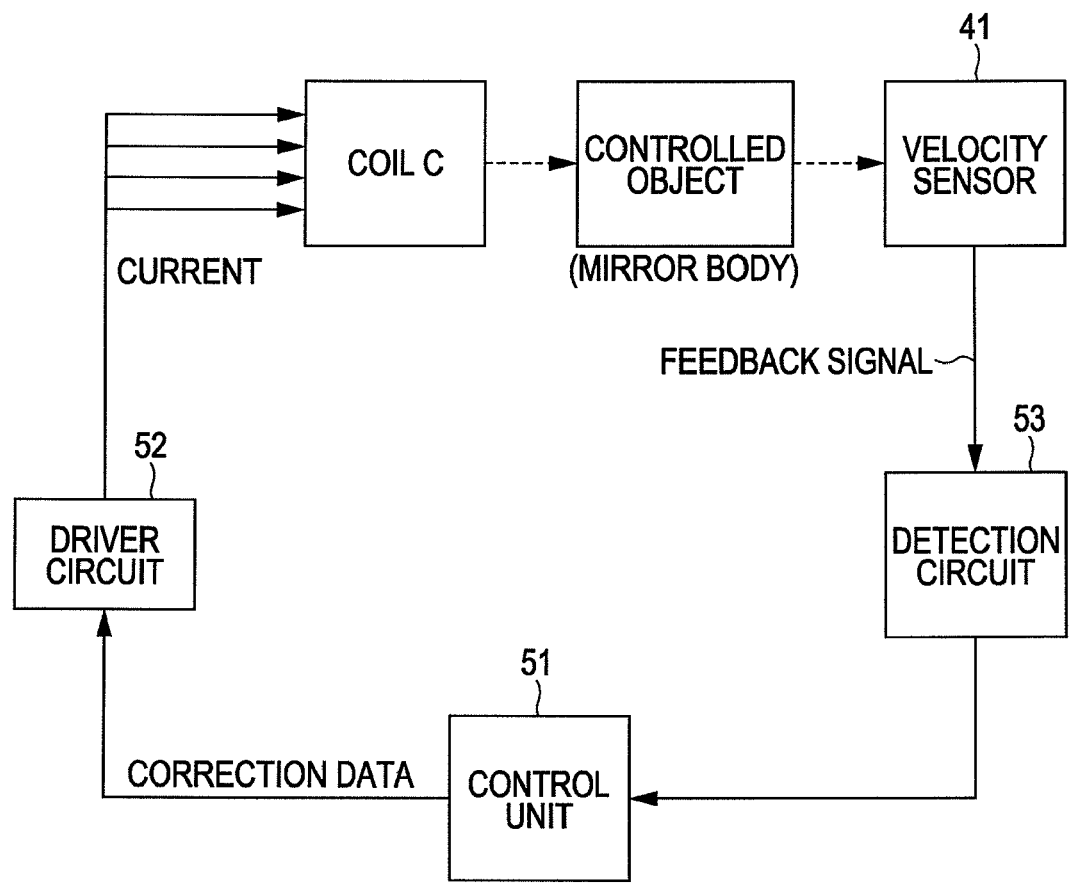
FIG. 6 is a block diagram showing the configuration of a control mechanism in the actuator.
Figure 7:
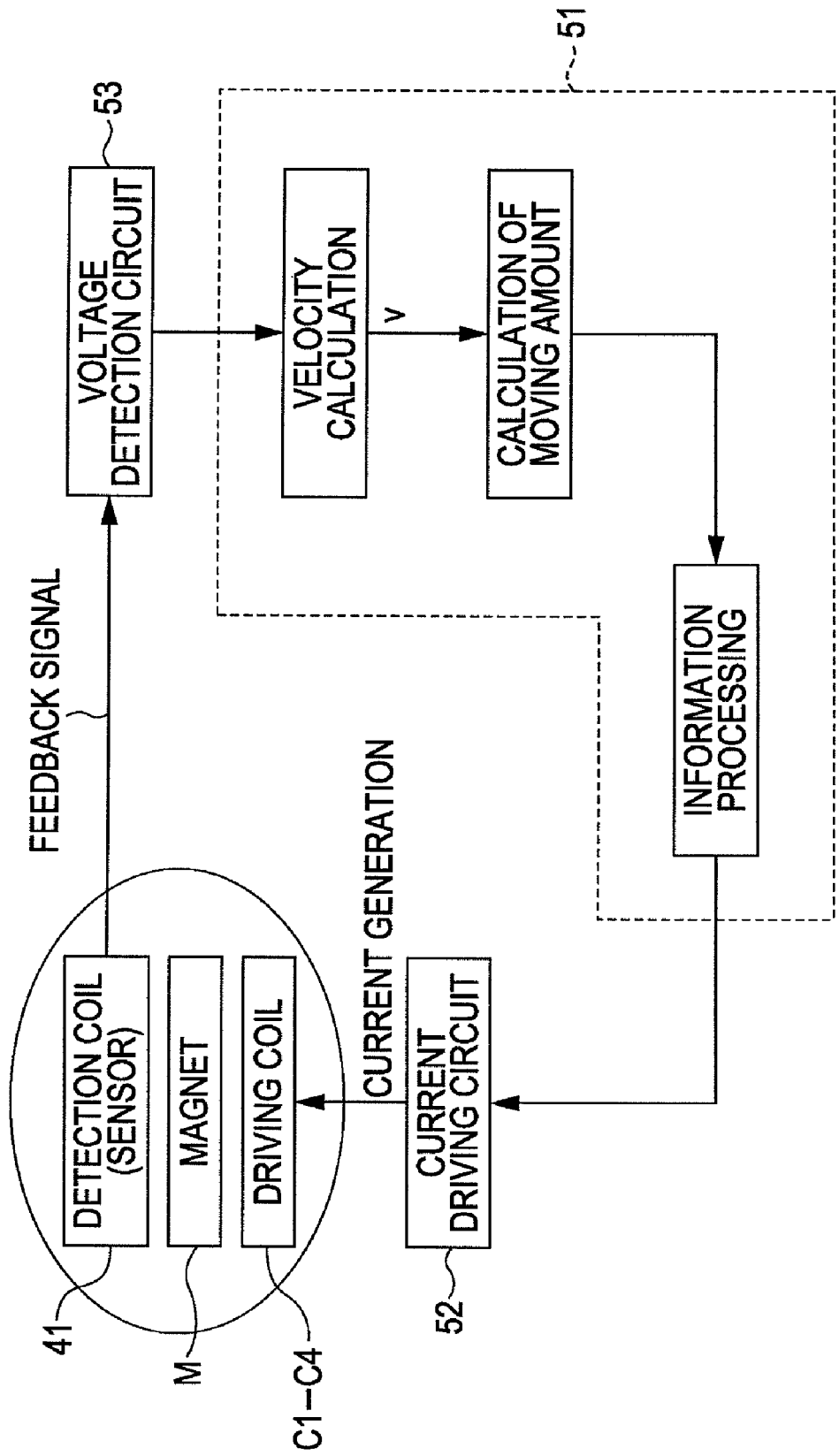
FIG. 7 is a flowchart showing control of the actuator.

FIG. 4 is a cross-sectional view showing an operating state of the actuator, and FIG. 5 shows a detecting operation of the velocity sensor. FIG. 5A shows a state before the arm moves, and FIG. 5B shows a state after the arm has moved. FIG. 6 is a block diagram showing the configuration of a control mechanism in the actuator, and FIG. 7 is a flowchart illustrating control of the actuator.

As shown in FIG. 4, when predetermined currents are applied to the driving coil C1 and the driving coil C2, electromagnetic forces are generated in the driving coils C1 and C2 according to the Fleming's left-hand rule by the currents flowing through the driving coils C1 and C2 and magnetic fluxes $\phi$ passing through the gaps g. In accordance with the direction of the current flowing through the driving coil C1, the electromagnetic force is generated in the driving coil C1 in a direction F1 orthogonal to the winding direction of the driving coil C1 or the opposite direction F1'. Further, in accordance with the direction of the current flowing through the driving coil C2, the electromagnetic force is generated in the driving coil C2 in a direction F2 orthogonal to the winding direction of the driving coil C2 or the opposite direction F2'. When an electromagnetic force in the F1-direction is generated in the driving coil C1, an electromagnetic force in the F2-direction is generated in the driving coil C2. Similarly, when an electromagnetic force in the F1'-direction is generated in the driving coil C1, an electromagnetic force in the F2'-direction is generated in the driving coil C2.

The driving coil C1 and the driving coil C2 are fixed to the fixed member 15. For this reason, even when the electromagnetic forces are generated, the driving coil C1 and the driving coil C2 themselves do not move. Hence, the electromagnetic forces react on the magnetic-field generating unit 30A. For example, when an electromagnetic force in the F1'-direction is generated in the driving coil C1, a reacting force acts in the F1-direction opposite thereto. Similarly, when an electromagnetic force in the F2'-direction is generated in the driving coil C2, a reacting force acts in the F2-direction opposite thereto.

Therefore, the shaft member 12 can be swung (tilted) on the support center point O in the direction $\beta 1$ or $\beta 2$ by controlling the directions of currents to be passed through the driving coils C1 and C2.

The above-described point also applies to the driving coil C3 and the driving coil C4. That is, the shaft member 12 can be swung (tilted) in the direction $\alpha 1$ or $\alpha 2$ shown in FIG. 2 in accordance with the directions of currents to be passed through the driving coil C3 and the driving coil C4.

For this reason, the orientation of the mirror member 20 provided at one end of the shaft member 12 can be changed freely.

When the shaft member 12 tilts, as shown in FIG. 4, the arms 31*a* and 32*a* also move. For this reason, the magnetic fluxes φ in the gaps g that interlink in the detection coils 41*a* change.

An electromotive force e generated in the detection coil 41*a* can be given by the following expression:

$$e = -\frac{d\phi}{dt} = -\frac{dL \times B}{dt} = -LvB$$

where L represents the width of the gap g in the Y-direction (width of the arms 31*a* and 32*a*), x represents the moving distance (moving distance of the controlled object during swinging), B represents the magnetic flux density of the magnetic flux φ, t represents the time, and v (=dx/dt) represents the velocity component (velocity of the controlled object during swinging), as shown in FIGS. 5A and 5B.

In short, the detection coil 41*a* detects an electromotive force (feedback signal) e that follows the Fleming's right-hand rule, from the physical quantity, that is, the velocity of the controlled object during swinging. When the width L and the magnetic flux density B are regarded as constant, the output electromotive force e is proportional to the velocity component v. That is, the detection coil 41*a* functions as a velocity sensor.

The above-described point also applies to the detection coils 41*a* provided at the other driving coils C2, C3, and C4. By using the detection coils 41*a*, the velocity components v in the directions can be detected.

The driving coil C1 and the driving coil C2 are arranged such as to be symmetrical with respect to the neutral axis O1-O1. For this reason, the electromotive force e detected by the velocity sensor 41 at the driving coil C1 and the electromotive force e detected by the velocity sensor 41 at the driving coil C2 have the same amplitude in theory. Hence, when the driving coils are arranged such as to be symmetrical with respect to the neutral axis O1-O1, the velocity sensor 41 may be provided at only one of the driving coils. That is, in the above-described embodiment, at least two velocity sensors 41 may be provided, for example, one velocity sensor 41 may be provided at each of the driving coil C1 and the driving coil C3. In this case, the velocity sensor 41 at the driving coil C3 detects the velocity in the direction α1 or α2 around the X-axis direction. Similarly, the velocity sensor 41 at the driving coil C1 detects the velocity in the direction β1 or β2 around the Y-axis direction.

Preferably, as shown in FIGS. 6 and 7, the control mechanism of the actuator 10 mainly includes a control unit 51, a driver circuit (current driving circuit) 51 for applying current to the driving coils C1, C2, C3, and C4, and a detection circuit (voltage detection circuit) 53 for detecting feedback signals from the velocity sensors 41.

The control unit 51 includes a computing unit (e.g., a CPU and a memory) that plays a main role in computation. The detection circuit 53 converts voltages (electromotive forces e; velocity components) output from the detection coils 41*a* of the velocity sensors 41 into data (digital values), and feeds the data back to the control unit 51.

As shown in FIG. 4, the output (electromotive force e) from the detection coil 41*a* means a velocity component (physical quantity) v in the direction of the tangent to a circle having a predetermined radius R provided when the shaft member 12 swings (turns) on the support center point O. Therefore, the control unit 51 obtains the velocity components v from the feedback signals, and performs a predetermined calculation using the velocity components v. For example, the control unit 51 sequentially calculates the moving amount of the mirror 21 serving as the controlled object. Further, the control unit 51 calculates the driving amount for driving the mirror 21 from a set value and the moving amount, and gives driving data corresponding to the driving amount to the driver circuit 52. Alternatively, the control unit 51 may obtain the tilt angles σ from the neutral axis O1-O1 in the directions, and may calculate the driving data from a set value and the present tilt angles σ.

On the basis of the driving data, the driver circuit 52 generates currents (driving signals) to be applied to the driving coils C1, C2, C3, and C4. On the basis of the currents applied to the driving coils C1, C2, C3, and C4, the above-described electromotive forces are generated, the shaft member 12 is swung, and the tilt angle of the mirror 21 serving as the controlled object is changed to a desired tilt angle θ.

The twisting forces of the first torsion bars 11*a* and the second torsion bars 11*b* that form the support member 11 increase as the twisting angle increases. The twisting forces act as resistance force on the driving force for swinging the shaft member 12. For this reason, when the tilt of the mirror 21 is variably controlled, it is necessary to apply, to the driving coils C1 to C4, currents that increase as the twisting angle increases.

In a typical hologram apparatus, several to several tens of milliseconds are taken to analyze read hologram data information, and to judge where the analysis result is proper. When feedback control is exerted on the actuator on the basis of the analysis result of the data information, the above-described time is added every time the feedback control is performed. Therefore, more time is taken until the hologram data information is read out properly.

In contrast, in the control mechanism of the actuator 10 according to the embodiment, the operating time, that is, the time taken until the control unit receives feedback signals from the velocity sensors 41 and gives instructions to the driver circuit 52, and the driver circuit 52 applies currents to the driving coils C1 to C4 according to the instructions and generates driving data on the basis of the feedback signals (velocity components) detected by the velocity sensors 41 is of the order of nanoseconds.

For this reason, even when there is a need to change the currents to be applied to the driving coils C1 to C4 in accordance with the twisting angle of the support member 11, as described above, the tilt angle θ of the mirror 21 can be quickly set with the control mechanism using the velocity sensors 41. That is, the hologram apparatus is superior in responsivity.

The control unit 51 can set and store data on optimal currents for the driving coils C1 to C4 beforehand in accordance with predetermined angles. This allows the tilt angle of the mirror 21 to be changed more accurately and quickly.

Attitude control performed using the read data information (hologram image data) may be used auxiliarily or confirmatively.

While the two-axis actuator that is mainly capable of driving around two axes, the X-axis and Y-axis, in the embodiment, the present invention is not limited thereto, and is also applicable to a single-axis actuator capable of driving only around the X-axis or the Y-axis.

While the actuator 10 controls the mirror member 20 as a controlled object in the above-described embodiment, for example, it can be used as an actuator for an antenna that changes the orientation of the antenna.

While the actuator in the above-described embodiment is of a moving magnet type in which the driving coils are provided in the fixed section and the magnetic-field generating unit including the magnet and the yokes is provided in the moving section, the present invention is not limited thereto. That is, the actuator may be of a moving coil type in which a magnetic-field generating unit including a magnet and yokes is provided in the fixed section and driving coils are provided in the moving section.

While the detection coils capable of detecting the velocity are used as sensors for detecting the tilt angle θ of the controlled object in the above-described embodiment, the present invention is not limited thereto. For example, changes in magnetic flux may be detected with magnetic detection elements such as a Hall element or a magnetoresistive element (e.g., an AMR, a GMR, or an MR).

What is claimed is:

1. An actuator comprising:
   a shaft member having a controlled object at one end thereof;
   a support member configured to support the shaft member swingably;
   a driving mechanism configured to drive the shaft member in a swinging direction;
   a sensor configured to detect a velocity of the shaft member during swinging; and
   a control mechanism configured to control the driving mechanism on the basis of a signal detected by the sensor,
   wherein the driving mechanism includes:
   a fixed section;
   a moving section mounted to the shaft member;
   a magnet and a pair of yokes provided in one of the fixed section and the moving section, the yokes respectively facing both poles of the magnet; and
   a plurality of cylindrical driving coils provided in the other of the fixed section and the moving section, and
   wherein the yokes have a plurality of arms extending sideward, the arms of the yokes are movably placed in the driving coils, and the sensor is placed in a gap in which the yokes face each other.

2. The actuator according to claim 1,
   wherein magnetic flux of the magnet passes through the yokes and the gap, and
   wherein the sensor is formed by a detection coil configured to detect a change in the magnetic flux.

3. The actuator according to claim 2, wherein the detection coil is formed by winding a wire in a planar shape, and a winding direction of the wire in the coil is orthogonal to the magnetic flux passing through the gap.

4. The actuator according to claim 1,
   wherein magnetic flux of the magnet passes through the yokes and the gap, and
   wherein the sensor is formed by a magnetic detection element configured to detect a change in the magnetic flux.

5. The actuator according to claim 1,
   wherein the support member includes:
   an outer frame portion supported by the fixed section;
   a middle frame portion provided inside the outer frame portion such as to swing around a first axis relative to the outer frame portion; and
   an inner frame portion provided inside the middle frame portion such as to swing around a second axis orthogonal to the first axis relative to the middle frame portion,
   wherein the outer frame portion and the middle frame portion are connected by a pair of first torsion bars extending along the first axis, and the middle frame portion and the inner frame portion are connected by a pair of second torsion bars extending along the second axis, and
   wherein the shaft member is attached to the inner frame portion.

6. The actuator according to claim 1, wherein the controlled object and the moving section are balanced in weight on a position where the shaft member is supported by the support member.

7. The actuator according to claim 1, wherein the control mechanism includes:
   a detection circuit configured to convert the signal output from the sensor into data;
   a control unit configured to calculate a driving amount necessary to drive the controlled object on the basis of the data; and
   a driver circuit configured to generate a driving signal to be applied to the driving mechanism on the basis of the calculated driving amount.

* * * * *